(12) United States Patent  
Terashima (10) Patent No.: US 7,657,168 B2  
(45) Date of Patent: Feb. 2, 2010

(54) IMAGE CAPTURE APPARATUS AND ZOOM LENS CONTROL METHOD FOR THE SAME

(75) Inventor: Yoshito Terashima, Tokyo (JP)

(73) Assignee: Sony Corporation, Tokyo (JP)

( * ) Notice: Subject to any disclaimer, the term of this patent is extended or adjusted under 35 U.S.C. 154(b) by 278 days.

(21) Appl. No.: 11/171,283

(22) Filed: Jul. 1, 2005

(65) Prior Publication Data

US 2006/0002697 A1   Jan. 5, 2006

(30) Foreign Application Priority Data

Jul. 2, 2004   (JP) .......................... P2004-197118

(51) Int. Cl.  
*G03B 17/00* (2006.01)

(52) U.S. Cl. ........................................ 396/87

(58) Field of Classification Search ............. 396/85–87, 396/90, 72  
See application file for complete search history.

(56) References Cited

U.S. PATENT DOCUMENTS 6,115,552 A * 9/2000 Kaneda ........................ 396/82
6,141,158 A * 10/2000 Kaneda ....................... 359/696
6,377,752 B1 * 4/2002 Ishii ............................. 396/87
6,487,370 B2 * 11/2002 Numako et al. .............. 396/83
6,606,206 B2 * 8/2003 Takeshita et al. ............ 359/704
2006/0007316 A1 * 1/2006 Yamanaka ............. 348/207.99

FOREIGN PATENT DOCUMENTS

JP   11-110045   4/1999

* cited by examiner

*Primary Examiner*—Christopher Mahoney  
(74) *Attorney, Agent, or Firm*—Finnegan, Henderson, Farabow, Garrett & Dunner, L.L.P.

(57) ABSTRACT

An image capture apparatus includes: a zoom motor which drives a target object of a retractable zoom lens drive mechanism; a driver for the zoom motor; a reference position detector detecting reference positions of the target object by using edges provided by each of two reset sensors; a position determination section determining as to a current position of the target object based on a current combination of outputs of the two reset sensors, a history of past outputs of the two reset sensors, and a driving direction of the target object; and a controller controlling drive of the zoom motor so as to drive the target object in a direction in which an arbitrary edge at one of the reference positions exists, in accordance with a determination result of the current position of the target object.

11 Claims, 9 Drawing Sheets

IMAGE CAPTURE APPARATUS AND ZOOM LENS CONTROL METHOD FOR THE SAME

BACKGROUND OF THE INVENTION

1. Field of the Invention

The present invention relates to an image capture apparatus which performs control of a lens drive system during image capture, and a zoom lens control method for such image capture apparatus.

2. Description of Related Art

Open-loop control methods using stepping motors as actuators have been widely used in recent camera drive systems. In such a control mechanism, positioning resolution has been increased to such an extent that position accuracy of the order of several μm can be realized.

However, in open-loop drive control using a stepping motor, since it is difficult to know whether a lens which is a target object to be controlled is actually moving according to a required value, an out-of-step phenomenon in which control by a control section is difficult always becomes a large problem. In the open-loop drive control using the stepping motor, even if such out-of-step phenomenon occurs, the stepping motor is regarded as moving accurately, so there is a possibility that a discrepancy occurs between the position of the lens which is a target object to be controlled and a directed position (target value). Once the deviation occurs, the stepping motor becomes unable to perform correct operation so long as special correction processing is not performed.

Accordingly, because the out-of-step phenomenon easily occurs in the open-loop control using the stepping motor, an out-of-step correction function is very important, and it is desirable that "out-of-step" can be detected and corrected at as many positions as possible in an area which is be normally used, i.e., between a wide-angle end and a telephoto end.

Existing determination methods for lens positions are as follows.

A first method is of the type which acquires an absolute position by using a Hall sensor, a potentiometer and the like.

A second method is of the type which uses a reset sensor for detecting a reference position and an FG (frequency generator) pulse counter for counting pulses from the reference position, the reset sensor and an MR (magnetoresistive) sensor, or the like, and acquires a relative position with respect to the reference position by a combination of the reset sensor and an encoder.

A third method is of the type which detects a plurality of reference positions by using a plurality of reset sensors such as two reset sensors or three reset sensors.

If the first method is used, feedback control can be introduced, so that the issue of "out-of-step" can be avoided. However, the first method has the issue that noise components easily enter a sensor itself, a cost issue, and the size issue that the first method is disadvantageous for reductions in size of lens systems. A decrease in positioning accuracy due to noise is particularly a fatal issue.

In the second method as well, once a reference position is determined by a reset sensor, feedback control using an encoder can be performed to avoid the issue of "out-of-step". However, there are issues such as increased costs and the issue that the second method is disadvantageous for reductions in size of lens systems.

In the third method, it is possible to realize at low cost and with comparatively high position accuracy a determination as to whether the output of a reset sensor is at a high level or a low level, which determination is based on whether the reset sensor is interrupted by a interrupting section. Stepping motors which are currently widely used as actuators for driving zoom lenses of cameras do not need absolute position detection, because of their open-loop control. Accordingly, in many cases where stepping motors are used, a method of the type which uses a plurality of reset sensors as in the third method is adopted.

A 2-reset-sensor type using two reset sensors is currently general in a combination of the third method and a retractable lens system in which a movable zoom lens tube is movable between a retracted state and a projected state with respect to a lens barrel. The term "2-reset-sensor" means, as indicated by the name, a structure of the type having two reset sensors for position detection. In general, the 2-reset-sensor type uses two reset sensors each having one switching point (edge) between its output levels, and can perform positioning necessary for open-loop control of a retractable lens by means of a combination of such two reset sensors or by detecting a switching point (edge) between the output levels of each of the two reset sensors.

The functions necessary for the retractable lens system are first to fourth ones which will be listed below.

The first function is to satisfy on a mechanism basis that the movable zoom lens tube is in the retracted state with respect to the lens barrel. The second function is to initialize the position of the movable zoom lens tube near a wide-angle end without out-of-step when the movable zoom lens tube is moved forward with respect to the lens barrel. The third function is to satisfy on a mechanism basis that even if a focus lens is driven to move in the lens barrel through its entire operation range, a zoom lens is located in an noninterference area where the zoom lens and the focus lens do not collide with each other. The fourth function is to enable a control section to perform position control during out-of-step between the wide-angle end and a telephoto end when the movable zoom lens tube is moved with respect to the lens barrel from a retracted state to a projected state.

Figure 8A:
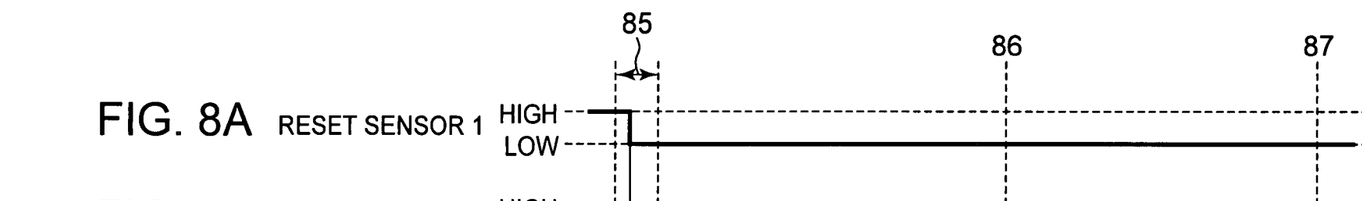
FIGS. 8A and 8B are diagrams respectively showing an output of a conventional basic 2-reset-sensor structure 1, i.e., an output of a reset sensor 1 and an output of a reset sensor 2.
Figure 8B:
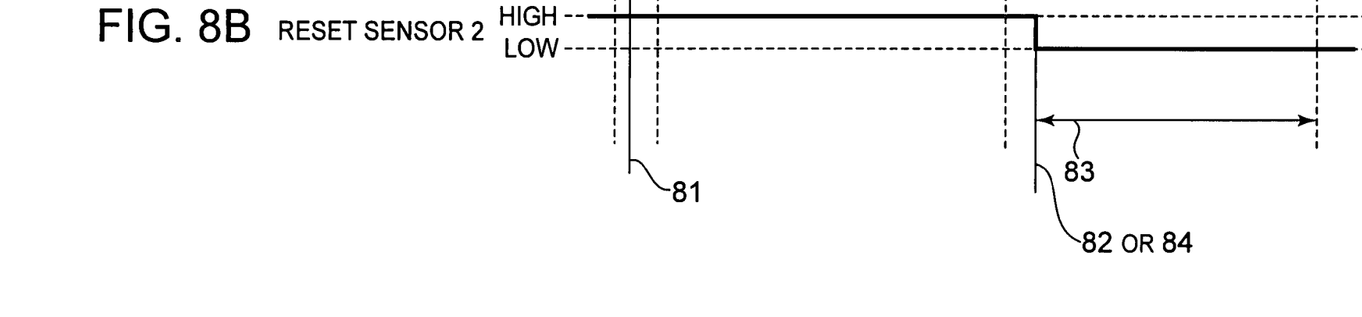

FIGS. 8A and 8B are diagrams showing the output of a conventional basic 2-reset-sensor structure 1. FIG. 8A shows the output of a reset sensor 1, while FIG. 8B shows the output of a reset sensor 2.

A method of realizing the first to fourth functions necessary for the retractable lens system by basic combinations of reset sensor output levels shown in FIGS. 8A and 8B will be described below. A retraction end determination shown at 81 is carried out on the basis of whether the output of the reset sensor 1 shown in FIG. 8A switches from its high level to its low level or from the low level to the high level. An area including the retraction end determination 81 and taking a mechanical backlash into account forms a retraction area 85.

Zoom-position initialization shown at 82 is carried out by detecting in which area a zoom lens is currently located between a wide-angle end 86 and a telephoto end 87, on the basis of a combination of the low level and the high level or a combination of the low level and the low level, which are the outputs of each of the reset sensor 1 shown in FIG. 8A and the reset sensor 2 shown in FIG. 8B. According to this process, before initialization of a zoom position is performed, it is possible to determine whether the focus lens and the zoom lens can be driven, thereby reducing the time required to initialize the focus lens and the zoom lens and greatly contributing to a total reduction in the start time of a camera.

A determination as to a zoom lens/focus lens noninterference area shown at 83 and out-of-step position correction shown at 84 are performed between a wide-angle end 86 and a telephoto end 87 on the basis of a determination as to switching between the output levels of the reset sensor 2 shown in FIG. 8B.

Figure 9A:
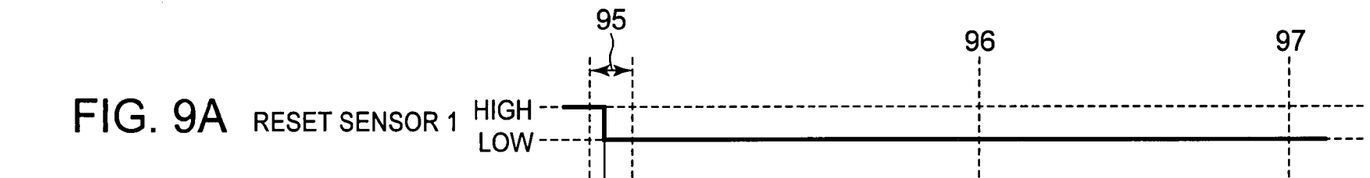
FIGS. 9A and 9B are diagrams respectively showing an output of a conventional basic 2-reset-sensor structure 1, i.e., an output of a reset sensor 1 and an output of a reset sensor 2.
Figure 9B:
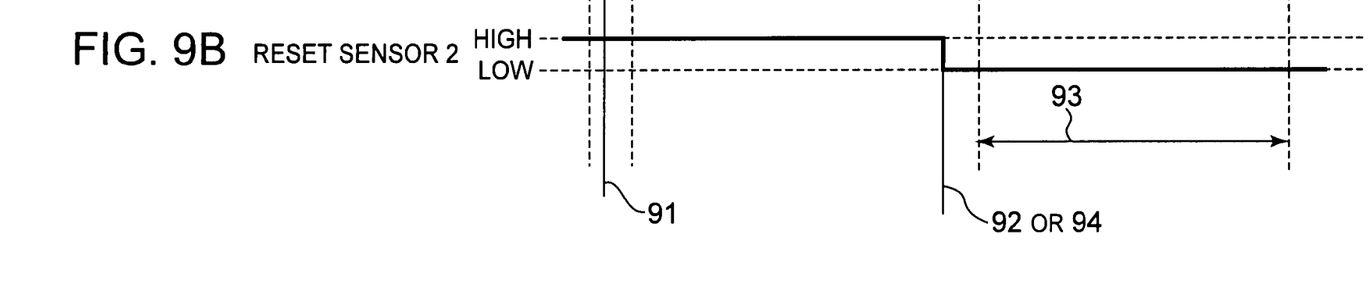

FIGS. 9A and 9B are diagrams showing the output of a conventional basic 2-reset-sensor structure 2. FIG. 9A shows the output of a reset sensor 1, while FIG. 9B shows the output of a reset sensor 2.

In the method shown in FIGS. 8A and 8B, in the case of a lens system in which a zoom lens/focus lens noninterference area 93 shown in FIGS. 9A and 9B is not in the vicinity of a wide-angle end 96 but out-of-step position correction 94 is between the wide-angle end 96 and a retraction area 95, because the combination of the reset sensor outputs becomes as shown in FIGS. 9A and 9B, there occurs a restriction in which the out-of-step position correction 94 and zoom-position initialization 92 are not performed so long as the zoom lens is not driven from the wide-angle end 96 toward the retraction area 95.

In the case of a structure in which one reset sensor has one edge, a position where out-of-step position correction can be effected is substantially limited to one position. Accordingly, even if there is a position where the zoom lens easily becomes out of step near the telephoto end 97, it is difficult to effect out-of-step position correction at the position.

A stepping motor control method is also disclosed (refer to Patent Document 1 (Japanese Patent Application Publication JP H11-110045). In this method, feedback control of a stepping motor is performed, and a zoom control section refers to a zoom lens operation switch, a reference position detection signal of a zoom reset sensor, and a current position detection signal of a zoom lens outputted from a detection circuit, and outputs a control signal for the zoom lens to a motor driver to drive a zoom motor. A zoom control section determines whether the zoom motor is operated according to the control command.

SUMMARY OF THE INVENTION

The above-mentioned issues of the 2-reset-sensor can be easily avoided by simply increasing the number of reset sensors. However, an increase in the number of reset sensors causes the following disadvantages.

The first disadvantage is that the number of reset sensors increases and the circuit configuration of an MCU (micro computer unit) is complicated, so the cost of a lens drive part increases.

The second disadvantage is that the total volume occupied by the reset sensors increases and the size of a lens at a mounting position is restricted, so the size of a lens system increases.

The third disadvantage is that a failure probability increases by the increased number of reset sensor, so a failure rate increases.

In view of the above-mentioned background, the present invention provides an image capture apparatus having a configuration that performs out-of-step detection at as many positions as possible while minimizing the number of reset sensors by using reset sensors of a type that have a plurality of edges per reset sensor, and provides a lens control method for such image capture apparatus.

In addition, in order to satisfy the above-mentioned first to fourth functions necessary for the above-mentioned retractable lens system having the reset sensor structure, the present invention provides an image capture apparatus which determines where the current zoom position is, in a lens system in which one reset sensor has a plurality of edges, as well as a lens control method for such image capture apparatus. The present invention also provides an image capture apparatus for initializing the zoom position by using a desired edge, and a lens control method for such image capture apparatus.

According to an embodiment of the present invention, there is provided an image capture apparatus. The apparatus includes: a zoom motor which drives a target object to be controlled of a retractable zoom lens drive mechanism; a driver for the zoom motor; a reference position detector configured to detect reference positions of the target object by using a plurality of edges provided by each of two reset sensors; a position determination section configured to make a determination as to a current position of the target object on the basis of a current combination of outputs of the two reset sensors of the reference position detector, a history of past outputs of the two reset sensors, and a driving direction of the target object; and a controller configured to control drive of the zoom motor via the driver so as to drive the target object in a direction in which an arbitrary edge at one of the reference positions exists, in accordance with a determination result of the current position of the target object.

According to the image capture apparatus, a determination is made as to the current position of the target object on the basis of the combination of current outputs of the two reset sensors of the reference position detector, the history of the past outputs of the two reset sensors, and the driving direction of the target object, and the target object is driven in the direction in which an arbitrary edge at one of the reference positions exists, according to a determination result of the position of the target object, whereby a zoom lens can be driven toward the edge to be detected, on the basis of the determination as to the area in which the zoom lens exists.

At this time, since it is possible to determine in which area the current position of the zoom lens is located, it is possible to perform initialization and out-of-step position correction of the position of the zoom lens by using a desired edge.

Accordingly, in the retractable zoom lens drive mechanism, the accuracy of out-of-step detection may be improved by providing as many reset sensor edges as possible while minimizing the number of reset sensors (reference position sensors each of which detects a switching edge of the output level of a respective one of photo interrupters and determines the current position of a target object to be controlled on the basis of the position of the edge).

According to the present invention, since a plurality of position corrections can be performed during out-of-step state with two reset sensor, it is possible to realize highly accurate out-of-step position control in a low-cost, space-saving manner.

On the other hand, there may be a case where an edge of a reset sensor unavoidably appears at an unintended position due to a reduction in size of a lens system. Specifically, there is a case where if the distance between reset sensors is short owing to a spatial restriction, a shading plate for either of the reset sensors interferes with the other reset sensor. For example, if a shading plate for forming an edge of a reset sensor 1 reaches the mounting position of a photointerrupter for a reset sensor 2, an unintended edge appears in the reset sensor 2.

In this case, if an existing initializing edge detection method for reset sensors is used, it is difficult to detect at which position a zoom lens is located when initialization of zooming is started, so drive control becomes difficult.

However, according to the present invention, it is possible to realize control which can substantially ignore an edge which unintentionally appears in a reset sensor, by a method of firstly detecting a position where a zoom lens is located and secondly driving the zoom lens in a direction in which an initializing edge exists, by using an algorithm which determines the current position of the zoom lens on the basis of the combination of current reset sensor outputs, a history of past reset sensor outputs and a driving direction of the zoom lens.

Accordingly, the present invention can contribute to an improvement in the accuracy of position correction during an out-of-step state of a lens system as well as reductions in size and cost of the lens system.

BRIEF DESCRIPTION OF THE DRAWINGS

The invention will become more readily appreciated and understood from the following detailed description of an embodiment of the invention when taken in conjunction with the accompanying drawings, in which.

DETAILED DESCRIPTION OF EMBODIMENT

An embodiment of the present invention will be described below in detail with reference to the accompanying drawings.

Figure 1:
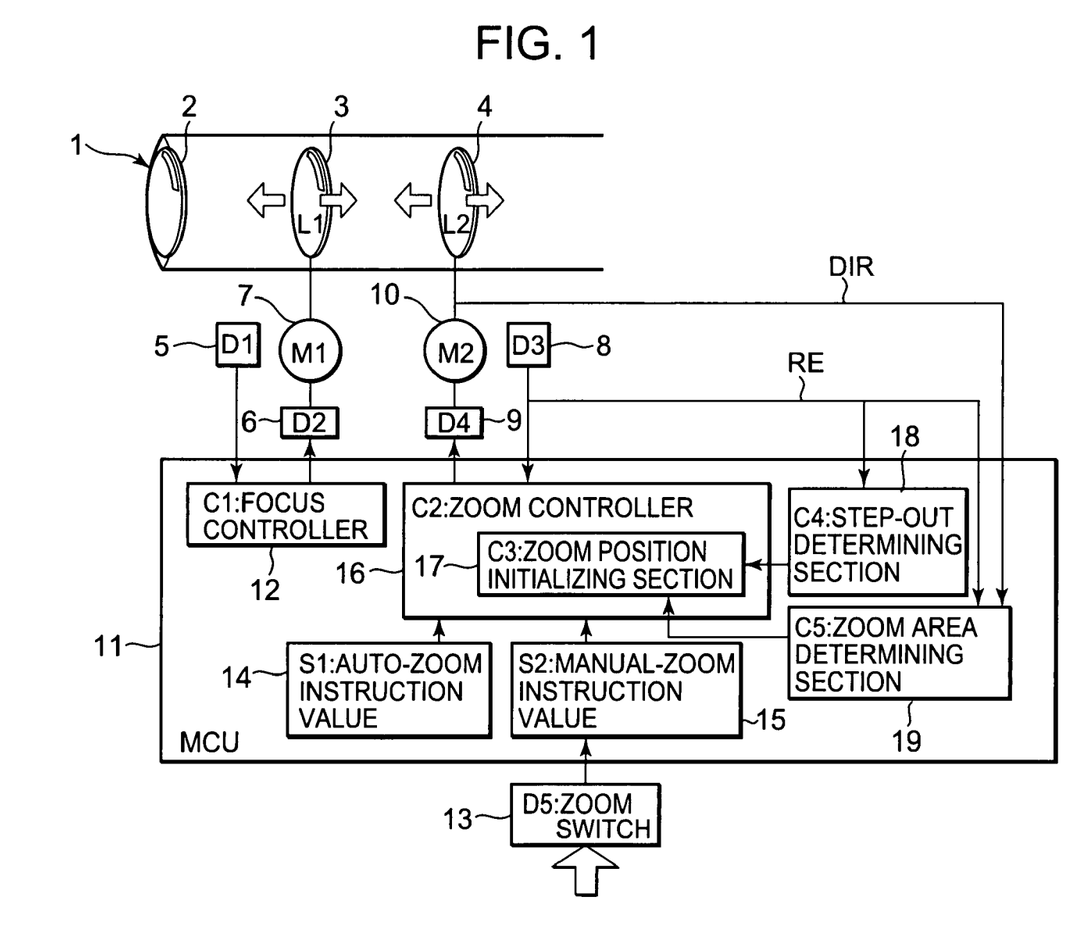
FIG. 1 is a schematic view showing an example of a configuration of a lens control block according to the present embodiment.

FIG. 1 is a schematic view showing an example of a configuration of a lens control block according to the present embodiment. FIG. 1 schematically shows a drive apparatus for a zoom lens.

As shown in FIG. 1, the lens control block has, as an optical system, a lens barrel 1 which permits a focus lens 3 to perform focus operation with respect to an objective lens 2 and houses a zoom lens 4 so as to permit it to perform zoom operation.

In addition, the lens control block has, as a focus drive system, a focus lens reset sensor 5 which detects a reference position, a focusing motor driver 6 which generates a drive signal for a focus motor 7, and the focus motor 7 which causes the focus lens 3 to move to a focus position.

In addition, the lens control block has, as a zoom drive system, a zoom reset sensor 8 which detects a reference position of a target object to be controlled of a retractable zoom lens drive mechanism by using a plurality of edges of each of two resent sensors, a zooming motor driver 9 which generates a drive signal for a zoom motor 10, and the zoom motor 10 which drives the target object.

In addition, the lens control block has, as a zoom drive system, a zoom reset sensor 8 which detects a reference position of a target object to be controlled of a retractable zoom lens drive mechanism by using a plurality of edges of each of two reset sensors, a zooming motor driver 9 which generates a drive signal for a zoom motor 10, and the zoom motor 10 which drives the target object.

In addition, the MCU 11 has, as a zoom drive system, a zoom control section 16 which generates command signals to be supplied to the zooming motor driver 9, on the basis of the reset sensor output from the zoom reset sensor 8.

In the present embodiment, the zoom control section 16 in particular has, as a function, a zoom area determination section 19 which determines the area of the current position of the target object from a combination of two current reset sensor outputs RE from the zoom reset sensor 8, the history of past two reset sensor outputs RE, and a driving direction DIR of the target object, and has a controller configured to control drive of the zoom motor 10 via the zooming motor driver 9 so as to drive the target object in the direction in which an arbitrary edge at one of reference positions exists, according to the result of a target object position determination by the zoom area determination section 19.

In addition, the zoom control section 16 is configured to have, as another function, a zoom position initialization section 17 which initializes, when an arbitrary edge at one of reference positions is an initializing edge, the current position of the target object on the basis of the initializing edge.

In addition, the zoom control section 16 is configured to have, as another function, an out-of-step determination section 18 which makes a determination as to out-of-step, from a combination of the two reset sensor outputs RE of the zoom reset sensor 8, and out-of-step correction means for correcting, when an arbitrary edge at one of reference positions is an out-of-step correcting edge, the current position of the target object on the basis of the out-of-step correcting edge.

In addition, the zoom control section 16 is configured to have, as another function, a retraction assurance determination section configured to make a determination as to a position which assures the retraction operation of a retractable zoom lens, on the basis of an arbitrary edge at one of reference positions.

In addition, the zoom control section 16 is configured to have, as another function, a noninterference area determination section configured to make a determination as to a noninterference area of the retractable zoom lens drive system relative to the focus lens drive system of the optical system on the basis of an arbitrary edge at one of reference positions.

The operation of the zoom-lens drive apparatus constructed in the above-mentioned manner will be described below.

The zoom control section 16 outputs a command signal to the zooming motor driver 9 on the basis of a manual zoom command value 15 generated from depression of a zoom switch 13 by a user or an autozoom command value 14 calculated by an automatic driving program.

The zooming motor driver 9 drives the zoom motor 10 which serves as an actuator, in accordance with the command signal, so that the zoom lens 4 is made to move. At this time, the reset sensor outputs RE of the zoom reset sensor 8 are used during operations such as initialization of the position of the zoom motor 10 by the zoom position initialization section 17, a zoom-position determination made by the zoom area determination section 19, and out-of-step detection performed by the out-of-step determination section 18.

Figure 2A:
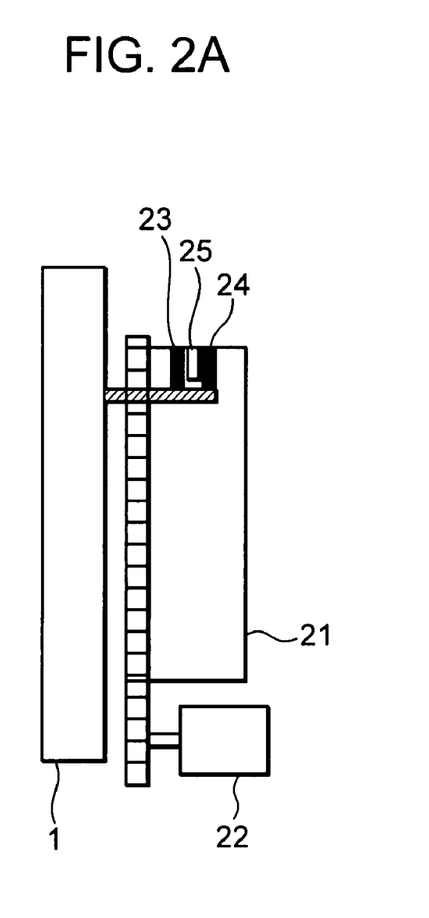
FIGS. 2A and 2B are a side view and a rear view showing positional relationship between reset sensors and shading plates.
Figure 2B:
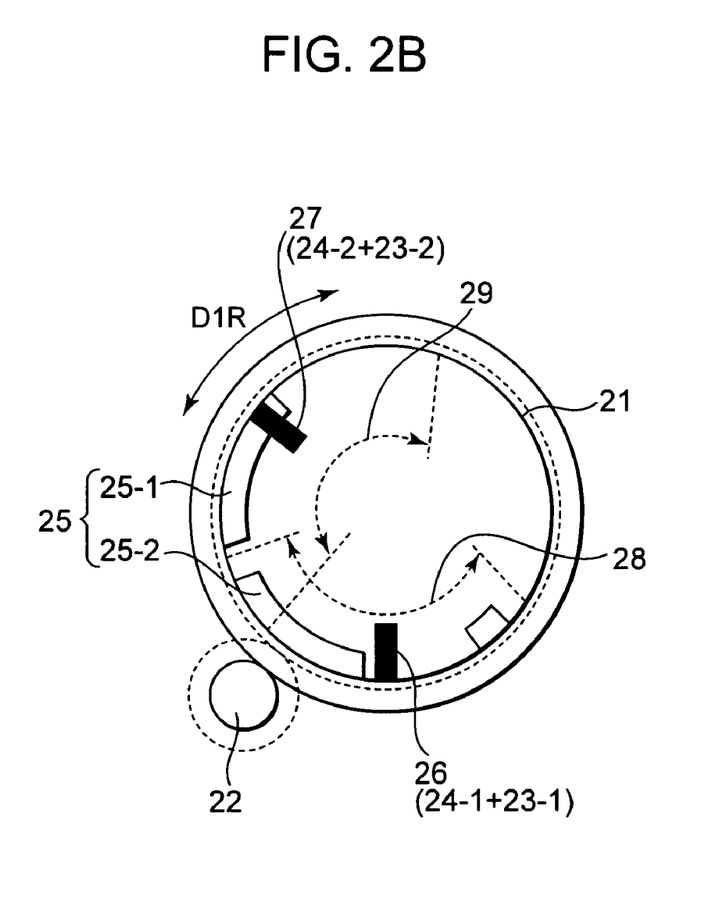

FIGS. 2A and 2B are views showing the positional relationship between reset sensors and shading plates. FIGS. 2A and 2B are a side view and a rear view, respectively.

As shown in FIGS. 2A and 2B, reset sensors 26 and 27 for the zoom lens 4 are provided on the internal circumferential side of a cam tube 21 joined to a stepping motor 22 by gears. The reset sensors 26 and 27 are respectively made of shading plates 25-2 and 25-1 each of which is made to move in synchronism with the rotation of the cam tube 21 driven by a stepping motor 22, light-emitting diodes 23-1 and 23-2 fixed to the lens barrel 1 on a light-emitting side by support members (not shown), and photosensors 24-1 and 24-2 provided on a light-receiving side.

The respective outputs of the reset sensors 26 and 27 are switched to their high levels while the shading plates 25-2 and 25-1 are respectively passing through the gaps between the light-emitting diodes 23-1 and 23-2 and the photosensors 24-1 and 24-2, and are switched to their low levels while the shading plates 25-2 and 25-1 are not passing through the gaps between the light-emitting diodes 23-1 and 23-2 and the photosensors 24-1 and 24-2 (otherwise, the respective outputs of the reset sensors 26 and 27 are switched to the low levels while the shading plates 25-2 and 25-1 are passing through, and are switched to the high levels while the shading plates 25-2 and 25-1 are not passing through). Whether the respective outputs of the reset sensors 26 and 27 are switched to the high levels or to the low levels while the shading plates 25-2 and 25-1 are respectively passing through the gaps between the gaps between the light-emitting diodes 23-1 and 23-2 and the photosensors 24-1 and 24-2 is determined by the manner of how to configure the sensor output circuits.

In this configuration, if only one point through which each of the shading plates 25-2 and 25-1 is to pass is present within a respective one of drive ranges 28 and 29 of the reset sensors 26 and 27, the reset sensors 26 and 27 serve as reset sensors each having one edge. If a plurality of points through which each of the shading plates 25-2 and 25-1 is to pass are present within a respective one of the drive ranges 28 and 29, the reset sensors 26 and 27 serve as reset sensors each having a plurality of edges. The distance between switching points of the output of each of the reset sensors 26 and 27 is determined by the length of a respective one of the shading plates 25-2 and 25-1.

In the case of stepping motor drive using reset sensors, a stepping motor can be controlled by a control unit with two pieces of information hereinafter: first information indicating between which edges a zoom lens is located; and second information indicating in which direction the zoom lens is to be driven. In a lens of the type in which one reset sensor has one edge, such information is used to execute the following processes necessary for control of a retractable zoom lens, i.e., the first process for confirmation of whether the zoom lens is in a retraction position, the second process for initialization of the position of the zoom lens near a wide-angle end, the third process for confirmation of being a focusing/zooming noninterference area, and the fourth process for position correction during an out-of-step state.

Figure 3A:
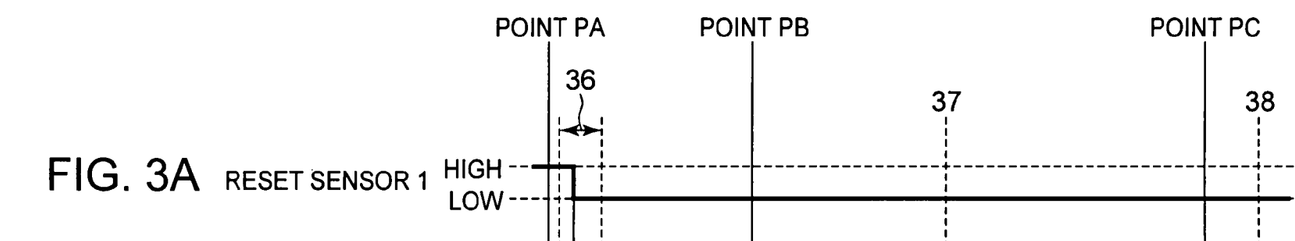
FIGS. 3A and 3B are diagrams respectively showing outputs of two assumed basic reset sensors, i.e., an output of a reset sensor 1 and an output of a reset sensor 2.
Figure 3B:
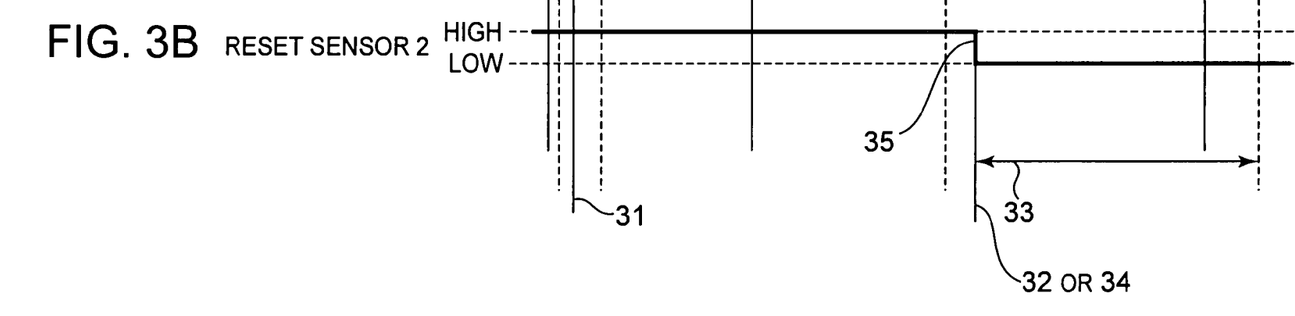

FIGS. 3A and 3B are diagrams showing the outputs of two assumed basic reset sensors. FIG. 3A shows the output of a reset sensor 1, while FIG. 3B shows the output of a reset sensor 2.

First, a control algorithm for a zoom lens having a structure in which one reset sensor has one edge, which zoom lens becomes a basis for the present embodiment, will be described below in detail with illustrative reference to FIGS. 3A and 3B. In the control algorithm, it is first confirmed whether the position of the zoom lens is in a retraction area 36, on the basis of a retraction determination denoted by 31. In this confirmation, it is determined whether the outputs of both of the reset sensor 1 and the reset sensor 2 respectively shown in FIGS. 3A and 3B are at their high levels. If the outputs of both of the reset sensor 1 and the reset sensor 2 respectively shown in FIGS. 3A and 3B are at the high levels, it is determined that the position of the zoom lens is in the retraction area 36; otherwise, it is enough if the zoom lens is driven toward the retraction area 36 until the combination of the outputs of the reset sensors 1 and 2 changes to a combination of reset sensor outputs corresponding to such high-level state.

This control method can be directly applied to confirmation of whether the zoom lens is in a focusing/zooming noninterference area as shown at 33. If the position of the zoom lens is in the focusing/zooming noninterference area 33, the outputs of both of the reset sensor 1 and the reset sensor 2 respectively shown in FIGS. 3A and 3B are at their low levels. Accordingly, if the outputs of the reset sensors 1 and 2 make such combination, it can be determined that the zoom lens is in the noninterference area; otherwise, it can be determined that the zoom lens is in an interference area.

The operation of detecting an edge which is at a point 1 shown at 35 and serves as an edge for zoom position initialization 32 or an edge for out-of-step correction 34 will be described below. It is known as design information that when initialization is started at a point PA or a point PB, if the zoom lens is driven toward a telephoto end 38, it is possible to detect the edge at the point 1 shown at 35. Accordingly, sequence control for driving the zoom lens toward the telephoto end 38 may be carried out. On the other hand, it is known that when initialization is started at a point PC, if the zoom lens is driven toward a wide-angle end 37, it is possible to detect the edge at the point 1 shown at 35. Accordingly, sequence control for driving the zoom lens toward the wide-angle end 37 may be carried out.

As mentioned above, the existing algorithm is configured, on the basis of the outputs of reset sensors, to detect the current position of a zoom lens and determine the driving direction thereof, thereby detecting an initializing edge or an out-of-step correcting edge or to determine whether the zoom lens is in a retraction assurance position or in a zooming/focusing noninterference area.

The control method for a zoom lens of the type in which one reset sensor has one edge is as mentioned above, otherwise the present embodiment intends to increase the number of edges per reset sensor so that an area can be determined by detecting these edges. In conformity to the existing algorithm, it is possible to increase the total number of retraction-end determination edges and initializing and out-of-step correcting edges up to a maximum of three. This is because if combinations of only two reset sensor outputs are used, there are four different methods for determining starting points, in accordance with the combinatorial number of a high level and a low level (if the number of reset sensors is N, the number of combinations of reset sensor outputs is the N-th power of 2). Conversely, this number is a physical restriction of the number of out-of-step correcting edges in the existing algorithm.

Figure 4A:
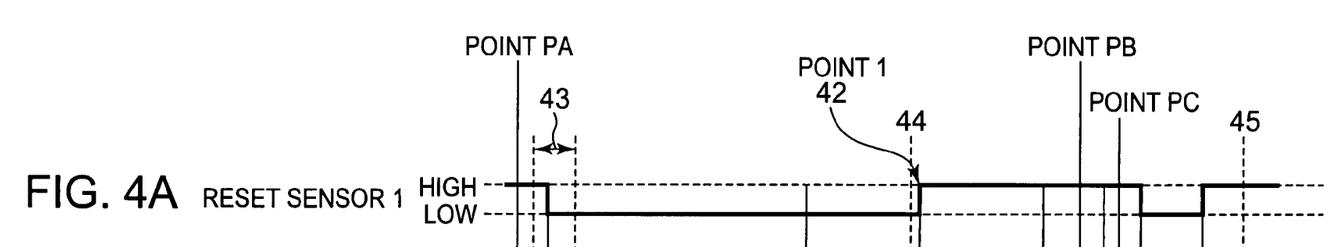
FIGS. 4A and 4B are diagrams respectively showing an output example obtained from operations of two multi-edge reset sensors, i.e., an output of a reset sensor 1 and an output of a reset sensor 2.
Figure 4B:
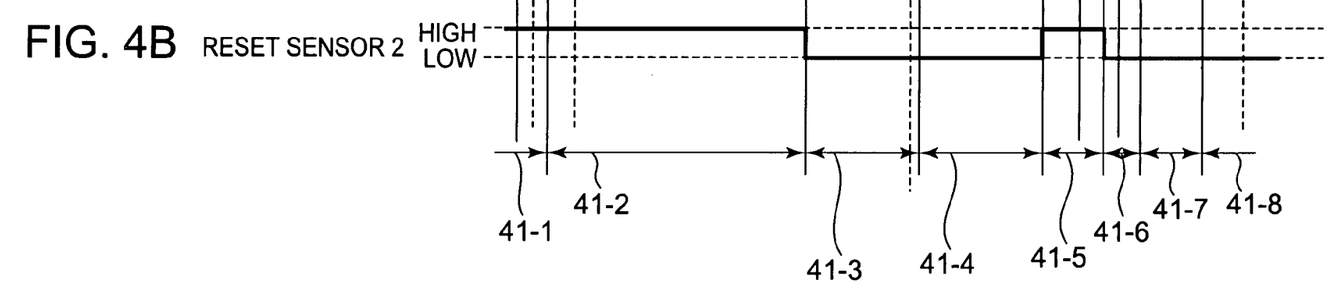

FIGS. 4A and 4B are diagrams showing an output example obtained from the operations of two multi-edge reset sensors. FIG. 4A shows the output of a reset sensor 1, while FIG. 4B shows the output of a reset sensor 2.

The embodiment of the present invention proposes, as a developed form of a multi-edge structure, a structure in which the number of edges per reset sensor is increased in order to increase the number of out-of-step correcting edges, irrespective of whether the current position of a zoom lens can be determined from a combination of reset sensor outputs. FIGS. 4A and 4B show a reset sensor output example obtained from a specific operation of such structure. A multiplicity of edges of each of the reset sensors 1 and 2 are set between a wide-angle end 44 and a telephoto end 45 so that the number of points at which to perform out-of-step correction can be increased. The reset sensor output example shown in FIGS. 4A and 4B can be realized by the configuration of the reset sensors shown in FIGS. 2A and 2B.

In the output example shown in FIGS. 4A and 4B, a retraction-end determination edge in a retraction area 43 is formed in the output of the reset sensor 1 shown in FIG. 4A, while in the output of the reset sensor 2 shown in FIG. 4B, an edge is formed between the retraction-end determination edge in the retraction area 43 and the wide-angle end 44.

In addition, in the output of the reset sensor 1 shown in FIG. 4A, an edge indicating a point 1 shown at 42 is formed at a position which is deviated from the wide-angle end 44 toward a telephoto end 45. In addition, in the output of the reset sensor 2 shown in FIG. 4B, edges are formed so as to be positioned on the opposite sides of a point PB. Edges which indicate an area between a point PC and the telephoto end 45 are also formed in the output of the reset sensor 1.

Since adoption of this structure precludes lens control based on existing control methods, the present embodiment proposes a control method as well. The reason why the structure precludes lens control based on existing control methods is as follows. If the point 1 shown at 42 is to be detected from the point PA shown in FIGS. 4A and 4B, the combinations of the outputs of the reset sensors 1 and 2 at both of the points PA and PB shown in FIGS. 4A and 4B assume the same output state in which the outputs of both of the reset sensor 1 shown in FIG. 4A and the reset sensor 2 shown in FIG. 4B are at their high levels. For this reason, if only the combinations of the outputs of the reset sensors 1 and 2 are checked, it is difficult to determine at which of the points PA or PB the zoom lens is located, so it is difficult to determine in which direction the zoom lens is to be driven so as to detect the edge at the point 1 shown at 42.

For the same reason, it can also be said that it becomes difficult to perform the operation of determining the current position, for example, determining whether the current position is in the retraction area 43. In other words, in the structure shown in FIGS. 4A and 4B, it is difficult to determine whether the zoom lens is in the retraction area 43 or at the point PB, because there are a plurality of points each having a combination of the same output states of the reset sensors 1 and 2.

Namely, if the number of edges of reset sensors is increased, a zoom lens is difficult to control without a new zoom-lens drive algorithm. The present embodiment, therefore, proposes an algorithm which detects an initializing edge and an out-of-step correcting edge from "combination of current reset sensor outputs+history of past reset sensor outputs+driving direction" and also determines whether the position of a zoom lens is in an retraction assurance position or in a noninterference area.

A basic concept of the algorithm is as follows. First, it is determined at which position a zoom lens is located. Then, the zoom lens is driven on the basis of configuration information in a direction where an edge to be detected exists, while information on the current position of the zoom lens is being updated on the basis of switching of output states of each reset sensor. In addition, while information on the current position of the zoom lens is being updated on the basis of switching of output states of each reset sensor, the zoom lens is driven so that the zoom lens can reach a desired position.

Areas identified with the combinations using changes of the output states of the reset sensors distinct from each other shown in FIGS. 4A and 4B are herein called "areas in each of which the zoom lens is located". In FIGS. 4A and 4B, the left side of the retraction-end determination edge in the retraction area 43 is an area 1 denoted by 41-1. An area 2 denoted by 41-2 and an area 3 denoted by 41-3 are provided between the retraction-end determination edge in the retraction area 43 and the point 1 shown at 42 at the position deviated from the wide-angle end 44 toward the telephoto end 45.

In addition, an area 4 denoted by 41-4, an area 5 denoted by 41-5, an area 6 denoted by 41-6, an area 7 denoted by 41-7, and an area 8 denoted by 41-8 are provided between the point 1 shown at 42 at the position deviated from the wide-angle end 44 toward the telephoto end 45 and the telephoto end 45.

First, a method of detecting a desired edge by using a new algorithm will be described below.

Figure 5:
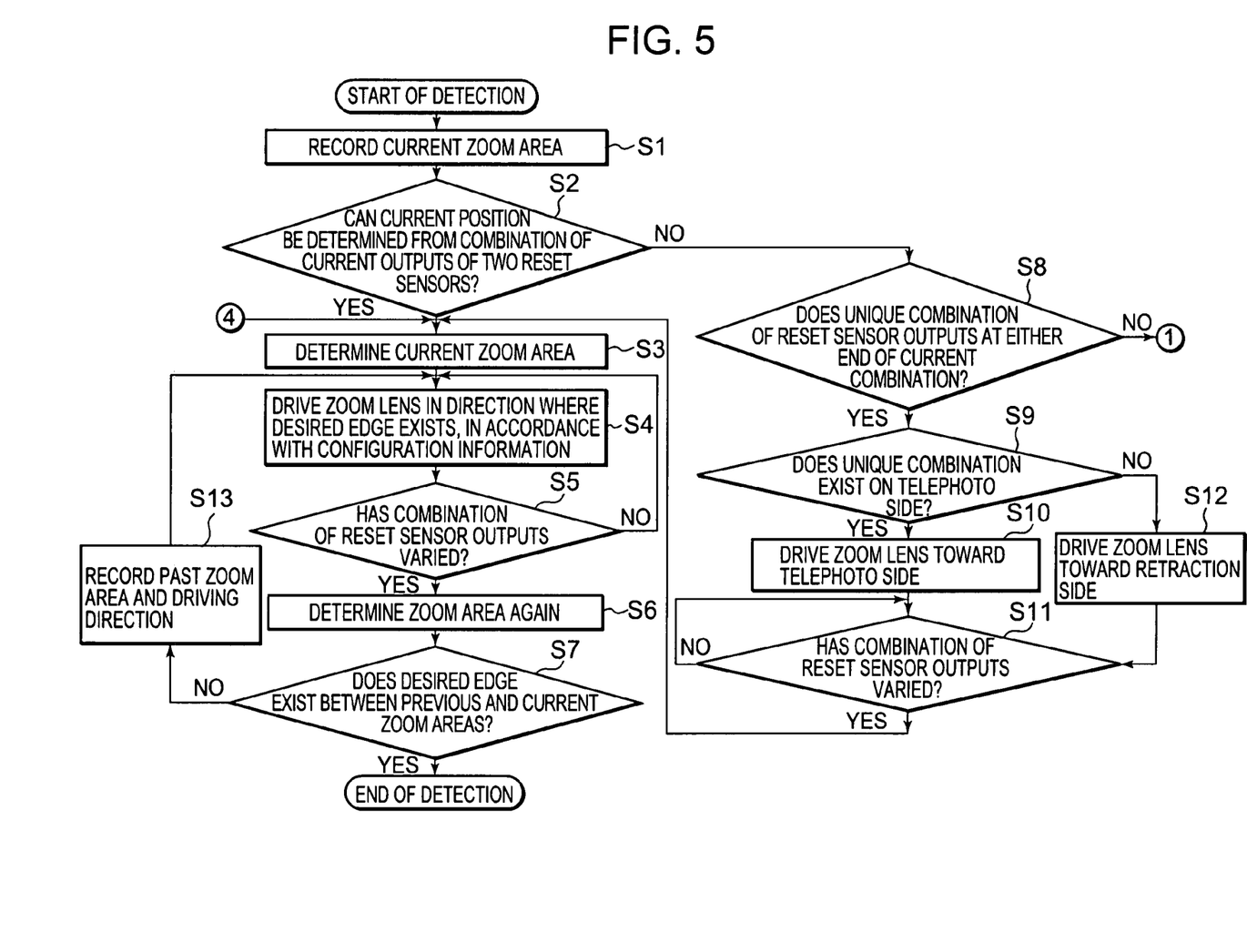
FIG. 5 is a flowchart showing a method for detecting a desired edge (Part 1)

FIG. 5 is a flowchart (including the example shown in FIGS. 4A and 4B) showing a method for detecting a desired edge (Part 1).

In FIG. 5, the current area in which the zoom lens is located is recorded (Step S1), and if the current position of the zoom lens can be determined from the current combination of the output states of the two reset sensors shown in FIGS. 4A and 4B (Step S2), information indicating whether a desired edge is located on the side of the retraction area 43 or on the side of the telephoto end 45 with respect to the current position can be known as configuration information (Step S3) so that the zoom lens is driven in a direction in which the edge is located, by using the information (Step S4).

Then, if the current position of the zoom lens cannot be determined from the current combination of the two output states of the two reset sensors (Step S2), i.e., if there exists a plurality of positions each having a combination of the same output states of the two reset sensors shown in FIGS. 4A and 4B, as shown at the points PA and PB in FIGS. 4A and 4B, and the current position is any of the positions, the zoom lens is driven by the following control method according to the structure of combination.

If a unique combination of the reset sensor outputs can be detected when the zoom lens is moved to either of the retraction side or the telephoto side (Step S8, Step S9 and Step S11), the zoom lens is driven in the direction in which the unique combination appears (Step S10 and Step S12). On the other hand, when there exists an area having a combination of the same output states as the combination of the current output states of the reset sensors and the zoom lens is to be driven toward the retraction side or the telephoto side (Step S10 and Step S12), if it can be determined that the zoom lens is located in an area in which it is already known that the current position can be restricted to a unique area by confirming the history of variations (Step S11) of the combination of the reset sensor outputs when the zoom lens was moved (Step S3), the zoom lens is driven in the direction in which the unique area exists (Step S4).

If there exists an area having a combination of the same output states as the combination of the current output states of the reset sensors and there is no assurance that a unique area can be detected when the zoom lens is driven in either direction at the point in time (Step S5), the zoom lens is sequentially driven in the same direction in the order of the first adjacent area, the second adjacent area, the third adjacent area and so on (Step S5), and area candidates are selected (Step S6) on the basis of the variation history (Step S5 and Step S13). The zoom lens is driven in the same direction (Step S13) until the current position can be specified in the end (Step S7).

Figure 6:
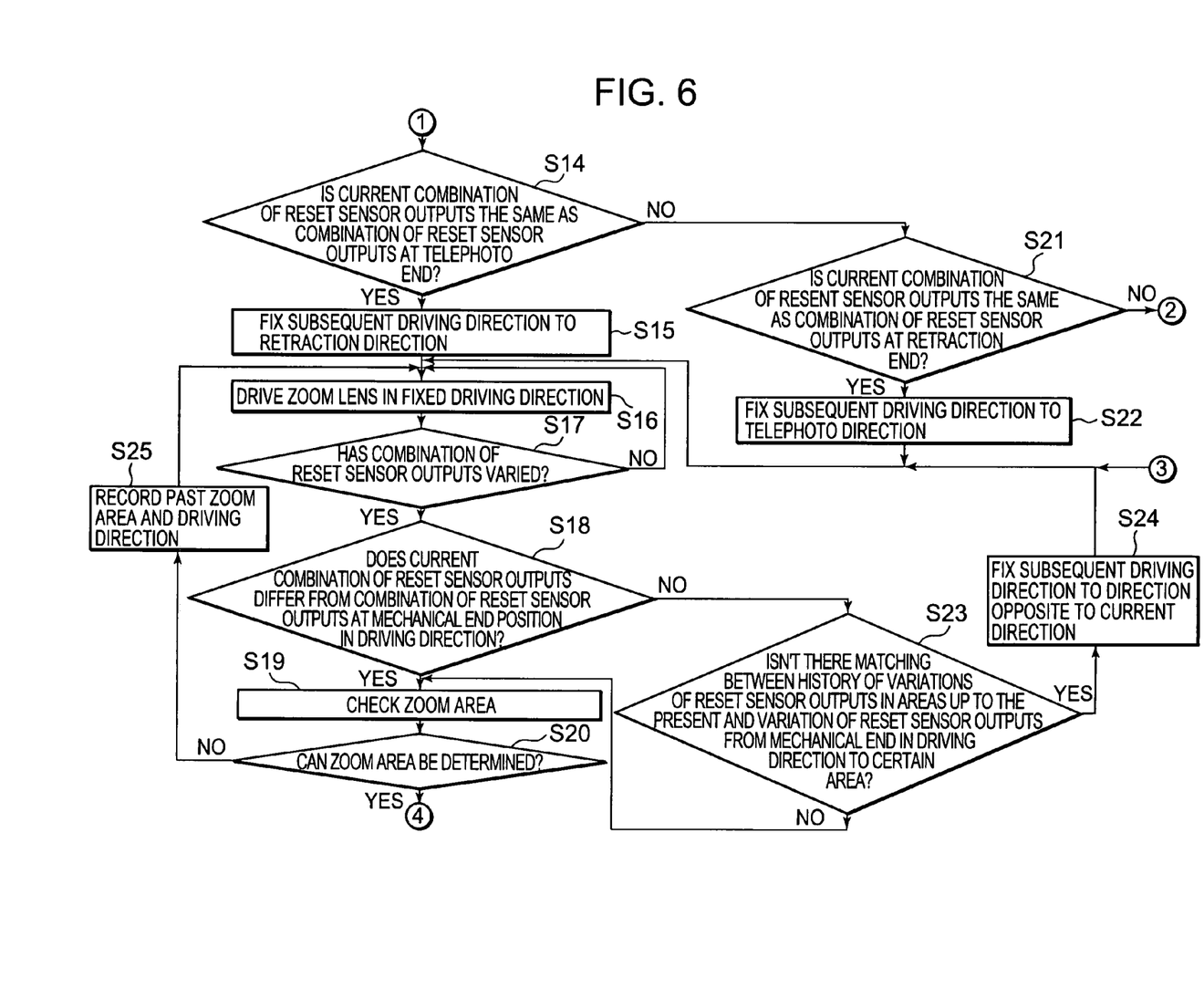
FIG. 6 is a flowchart showing a method for detecting a desired edge (Part 2)

FIG. 6 is a flowchart (Part 2) showing a method for detecting a desired edge. If the combination of the reset sensor outputs that is obtained while the zoom lens is moving in the retraction direction is the same as the combination to be obtained at the retraction end (Step S14) and the history of variations of the combination of the reset sensor outputs from a starting point to the current area coincides with the manner of variation of the combination of the reset sensor outputs from an arbitrary area to the retraction end (Step S21), the driving direction is changed to the telephoto-end direction (Step S22). Completely the same operation described hereinafter is also performed as to the opposite direction. If the combination of the reset sensor outputs that is obtained while the zoom lens is moving in the telephoto-end direction is the same as the combination to be obtained at the telephoto end and the history of variations of the combination of the reset sensor outputs from the starting point to the current area coincides with the manner of variation of the combination of the reset sensor outputs from an arbitrary area to the telephoto end (Step S14), the driving direction is changed to the retraction direction (Step S15).

However, if the current combination obtained at the starting time of detection is the same as the combination to be obtained at the telephoto end (Step S18 and Step S23), the zoom lens is inhibited from moving in the telephoto-end direction (Step S24) and is driven in the retraction direction (Step S16). Then, if the desired edge is not detected even when the zoom lens reaches the retraction end (Step S17, Step S18 and Step S23), the zoom lens is driven in the telephoto-end direction (Step S24 and Step S16). A similar operation is also performed as to the retraction-end direction. If the current combination obtained at the starting time of detection is the same as the combination to be obtained at the retraction end (Step S18 and Step S23), the zoom lens is inhibited from moving in the retraction-end direction (Step S24) and is driven in the telephoto-end direction (Step S16). Then, if the desired edge is not detected even when the zoom lens reaches the telephoto end (Step S17, Step S18 and Step S23), the zoom lens is driven in the retraction-end direction (Step S24 and Step S16).

If the current combination obtained at the starting time of detection is different from the combination to be obtained at the telephoto end (Step S18), and if the current combination obtained at the starting time of detection is different from the combination to be obtained at the retraction end (Step S18), a determination is made as to a zoom area in which the zoom lens is located (Step S19). If a determination can be made as to the zoom area (Step S20), the current zoom area is determined (Step S3). If a determination cannot be made as to the zoom area (Step S20), area candidates are selected on the basis of the variation history (Step S17 and Step S25) (Step S19). The zoom lens is driven in the same direction (Step S16) until the current position can be specified in the end (Step S20).

Figure 7:
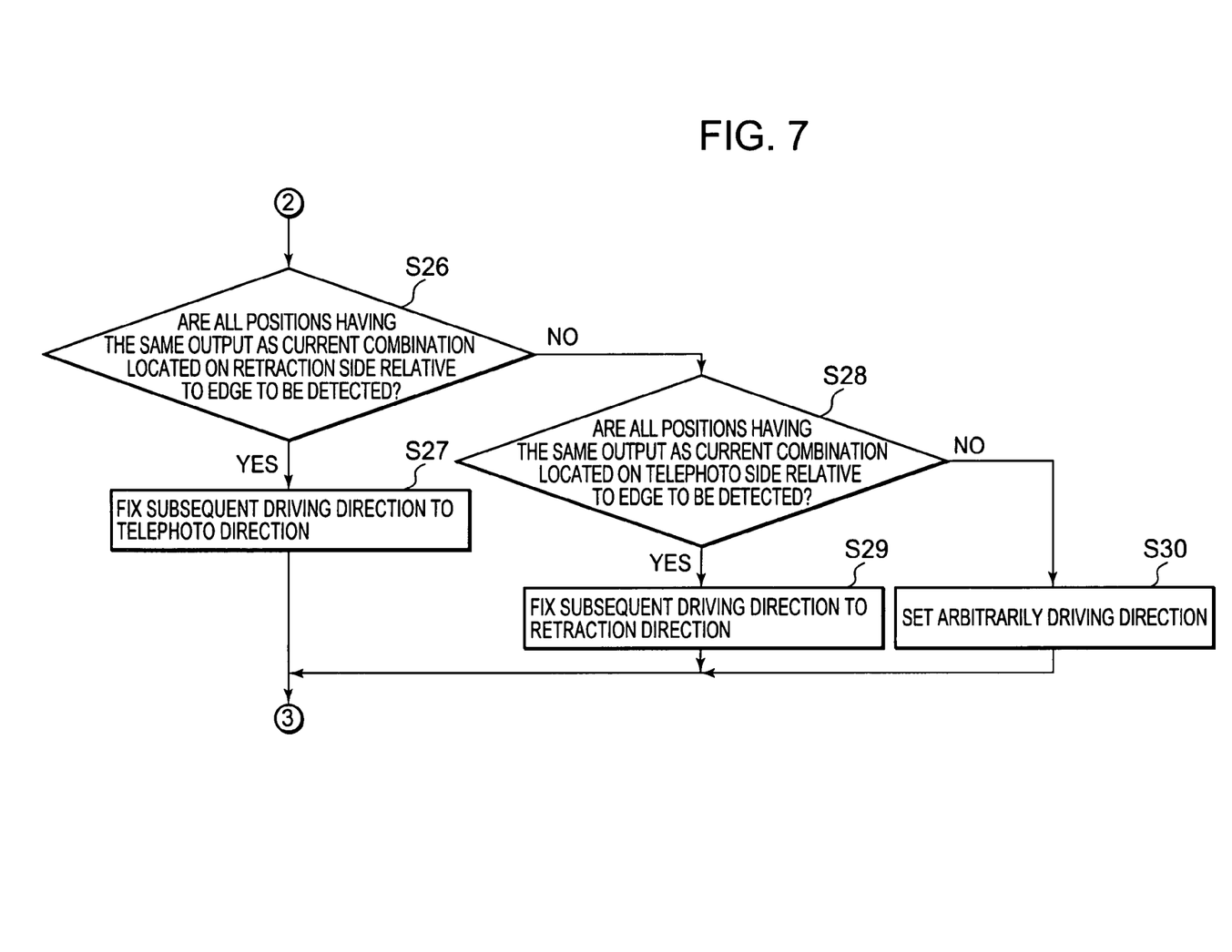
FIG. 7 is a flowchart showing a method for detecting a desired edge (Part 3)

FIG. 7 is a flowchart (Part 3) showing a method for detecting a desired edge.

In the case where the zoom area cannot be specified but it is known that all positions having combinations of the same output states as those of the current combination are located on the retraction side with respect to the desired edge (Step S26), if the driving direction is not designated, the zoom lens is driven in the telephoto-end direction (Step S27). Conversely, in the case where it is known that all such positions are located on the telephoto-end side (Step S28), if the driving direction is not designated, the zoom lens is driven in the retraction direction (Step S29). If it is not known whether all such positions are located on the retraction side or the telephoto-end side, the driving direction is arbitrarily set (Step S30), and is driven in the same direction (Step S16).

If the zoom lens is driven by the above-mentioned control method, only one position can be specified as the current position on the basis of the history of the past combinations of the two reset sensor outputs and the current combination thereof. Namely, since the history of variations of the combination of the reset sensor outputs and information on the driving direction can be added to the combinations of the reset sensor outputs, the amount of information for positioning is supplemented. Once the current position is detected, since a subsequent driving direction is recognized, it is possible to constantly detect where the zoom lens is located, by updating the current position of the zoom lens each time the output states of the reset sensors are switched.

If the zoom lens exists, for example, at the point PB shown in FIG. 4, it is difficult to determine whether the zoom lens is located at the point PB or the point PA, from only the output states of the reset sensors shown in FIGS. 4A and 4B. However, in accordance with the above-mentioned control method, the zoom lens is driven toward the telephoto end 45, and if the output level of the reset sensor 1 shown in FIG. 4A remains the high level and the output level of the reset sensor 2 shown in FIG. 4B changes from the high level to the low level, this combinational variation of the output levels appears only if the zoom lens starts to move from the point PB in an area 5 shown at 41-5; that is to say, it can be determined that the current position of the zoom lens is at the point PC in an area 6 shown at 41-6.

If the point 1 shown at 42 is to be detected during this state, the zoom lens is driven toward the retraction area 43 because of the design structure of the lens control block so that a point at which the output level of the reset sensor 1 shown in FIG. 4A switches from the high level to the low level may be detected.

In addition, in the above-mentioned control method shown in FIGS. 5 to 7, the control method shown in FIG. 7 is not essential, but has the function of reducing edge detection time. Accordingly, it can be said that it is desirable to use the control method shown in FIG. 7. It is assumed, for example, that the zoom lens is located near the wide-angle end 44 and a desired edge is located near the telephoto end 45. At this time, although, if a determination can be made as to the current position by driving the zoom lens toward either of the wide-angle end 44 or the telephoto end 45, it is possible to detect the edge in the end by driving the zoom lens in either direction. However, if it can be estimated that the edge is located in the direction of the telephoto end 45, it is possible to detect the edge in short time by driving the zoom lens toward the telephoto end 45 from the beginning.

The above-mentioned reset sensors have structural restrictions. Firstly, in the case where the outputs of the reset sensors are turned off during a stop state of driving of the zoom lens, even if the zoom lens starts to be driven at any point between the vicinity of the wide-angle end and the telephoto end, the zoom lens needs to move between the vicinity of the wide-angle end and the telephoto end so that the current position can be specified.

Secondly, in the case where the outputs of the reset sensors are not turned off during a stop state of driving of the zoom lens, even if the zoom lens starts to be driven at any point between the retraction end and the telephoto end, the position of the zoom lens needs to be specified by moving the zoom lens between the retraction end and the telephoto end so that the current position can be specified.

Thirdly, it is necessary to satisfy the condition that the combination of the output states of the reset sensor at the retraction end differs from the combination of the output states of the reset sensors at the telephoto end.

Regarding the first and second restrictions, if a zoom button of a camera is not pressed and zooming comes to a stop state during normal use, the outputs of the reset sensors are turned off. When control transitions from the off state to a lens driving state and the reset sensors are turned on, it is difficult to detect whether the zoom lens was moved by any disturbance when the outputs of the reset sensors were off, so an erroneous determination occurs. In order to prevent the erroneous determination, it is necessary to reset the past history, and it is necessary to perform the operation of again determining the current position. In this case, a necessary condition for control during normal use is that it is possible to know the current position between the vicinity of the wide-angle end and the telephoto end.

As a matter of course, if the reset sensors are normally turned on, even if the zoom lens is moved by disturbance and passes by an edge of anyone of the reset sensors, it is possible to acquire information indicating that the zoom lens has passed by the edge, so that update of the current position can be performed and occurrence of a missing current position can be prevented. Accordingly, as long as the current position of the zoom lens can be specified by causing the zoom lens to move once between the retraction end and the telephoto end, there is no problem even if the zoom lens is only driven between the wide-angle end and the telephoto end during normal use. Accordingly, it is only necessary to fix the current position between the retraction end and the telephoto end.

Regarding the third restriction, it is necessary to inhibit occurrence of the case in which the combination at the retraction end is the same as the combination at the telephoto end, because a contradiction occurs between the sequence of unconditionally driving the zoom lens toward the telephoto end if the current combination is the same as the combination at the retraction end and the sequence of unconditionally driving the zoom lens toward the retraction end if the current combination is the same as the combination at the telephoto end.

Although the algorithm of the edge detection method has been mentioned above, it is possible to determine where the current point is located, by applying the algorithm of "determining current position from combination of current reset sensor outputs+history of past reset sensor outputs+driving direction". Namely, it is also possible to make a determination as to whether the zoom lens is located at the retraction end and as to whether the zoom lens is located in the zooming/focusing noninterference area.

According to the control method using the above-mentioned algorithm, it is possible to realize the first to fourth functions necessary for a retractable lens system using reset sensors each having a plurality of edges.

The above description has referred to an example of control of a retractable zoom lens drive mechanism which interferes with control of a focus lens, but it goes without saying that the present invention is not limited to this example and can be applied to other retractable lens systems driven by stepping motors. In addition, the present invention can also be widely applied to other controlled objects which are driven by stepping motors so as to move from retracted states to projecting states.

The present invention contains subject matter related to Japanese Patent Application JP 2004-197118 filed in the Japanese Patent Office on Jul. 2, 2004, the entire contents of which being incorporated herein by reference.

What is claimed is:

1. An image capture apparatus for controlling a retractable zoom lens drive mechanism while capturing an image of a subject via an optical system and recording image information on a recording medium, comprising:
    a zoom motor for driving a target object, the target object being controlled by the retractable zoom lens drive mechanism;
    a driver for the zoom motor;
    a reset detector consisting essentially of two reset sensors;
    a reference position section configured to detect reference positions of the target object based on edges in the outputs of the two reset sensors, wherein an edge is a switching point between output levels of the two reset sensors;
    a position determination section configured to determine a current position of the target object based on:
        a combination of the outputs of the two reset sensors,
        a history of past outputs of the two reset sensors, and
        a driving direction of the target object; and
    a controller configured to control the driver to drive the target object in a direction in which a desired edge at one of the reference positions exists, the direction selected in accordance with the current position of the target object.

2. The image capture apparatus according to claim 1, further comprising:
    a position initialization section configured to initialize the current position of the target object based on the location of the desired edge if the desired edge is an initializing edge.

3. The image capture apparatus according to claim 1, further comprising:
    a position correction section configured to correct the current position of the target object based on the location of the desired edge if the desired edge is an out-of-step correcting edge.

4. The image capture apparatus according to claim 1, further comprising:
    a retraction assurance determination section configured to determine a position that assures a retraction operation of the retractable zoom lens based on the location of the desired edge at the one of the reference positions.

5. The image capture apparatus according to claim 1, further comprising:
    a noninterference area determination section configured to determine the location of a noninterference area of the retractable zoom lens drive mechanism with respect to a focus lens drive system of the optical system based on the location of the desired edge at the one of the reference positions.

6. A zoom lens control method for an image capture apparatus comprising a retractable zoom lens, an optical system, an image recording medium, a zoom motor for driving a target object, a retractable zoom lens drive mechanism for controlling the zoom motor, a driver for the zoom motor, and a reset detector consisting essentially of two reset sensors, the zoom lens control method comprising:
    detecting reference positions of the target object based on edges in the outputs of the two reset sensors, wherein an edge is a switching point between output levels of the two reset sensors;
    determining a current position of the target object based on:
        a combination of outputs of the two reset sensors,
        a history of past outputs of the two reset sensors, and
        a driving direction of the target object; and
    driving the target object in a direction in which a desired edge at one of the reference positions exists, the direction selected in accordance with the current position of the target object.

7. The zoom lens control method for an image capture apparatus according to claim 6, further comprising:
    initializing the current position of the target object based on the location of the desired edge if the desired edge is an initializing edge.

8. The zoom lens control method for an image capture apparatus according to claim 6, further comprising:

correcting the current position of the target object based on the location of the desired edge if the desired edge is an out-of-step correcting edge.

9. The zoom lens control method for an image capture apparatus according to claim 6, further comprising:
determining a position that assures a retraction operation of the retractable zoom lens based on the location of the desired edge at the one of the reference positions.

10. The zoom lens control method for an image capture apparatus according to claim 6, further comprising:
determining the location of a noninterference area of the retractable zoom lens drive mechanism with respect to a focus lens drive system of the optical system based on the location of the desired edge at the one of the reference positions.

11. An image capture apparatus for controlling a retractable zoom lens drive mechanism while capturing an image of a subject via an optical system and recording image information on a recording medium, comprising:
zoom motor means for driving a target object, the target object being controlled by the retractable zoom lens drive mechanism;
driving means for the zoom motor means;
a reset detector consisting essentially of two reset sensing means;
reference position detecting means for detecting reference positions of the target object based on edges in the outputs of the two reset sensing means, wherein an edge is a switching point between output levels of the two reset sensors;
position determining means for determining a current position of the target object based on:
a combination of outputs of the two reset sensing means,
a history of past outputs of the two reset sensing means, and
a driving direction of the target object; and
control means for controlling the driving means to drive the target object in a direction in which a desired edge at one of the reference positions exists, the direction selected in accordance with the current position of the target object.

* * * * *